US008259050B2

(12) United States Patent
Yun

(10) Patent No.: US 8,259,050 B2

(45) Date of Patent: Sep. 4, 2012

(54) LIQUID CRYSTAL DISPLAY DEVICE AND VIDEO PROCESSING METHOD THEREOF

(75) Inventor: Jae-Kyeong Yun, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 241 days.

(21) Appl. No.: 12/853,888

(22) Filed: Aug. 10, 2010

(65) Prior Publication Data

US 2011/0149146 A1 Jun. 23, 2011

(30) Foreign Application Priority Data

Dec. 21, 2009 (KR) ........................ 10-2009-0128537

(51) Int. Cl.

*H04N 3/14* (2006.01)
*G09G 3/36* (2006.01)
*G06F 3/038* (2006.01)
*G09G 5/10* (2006.01)

(52) U.S. Cl. ............ 345/89; 345/87; 345/101; 345/204; 345/690; 348/790

(58) Field of Classification Search ............ 345/87–104, 345/204–215, 690–699; 348/790
See application file for complete search history.

(56) References Cited

U.S. PATENT DOCUMENTS 6,271,809 B1 * 8/2001 Kim ................................ 345/60
2002/0063807 A1 * 5/2002 Margulis ........................ 348/745
2003/0179175 A1 * 9/2003 Shigeta et al. ................ 345/101
2004/0263462 A1 * 12/2004 Igarashi .......................... 345/98
2005/0122305 A1 * 6/2005 Murao et al. .................. 345/101
2005/0179854 A1 * 8/2005 Sekine et al. ................. 349/161
2006/0221069 A1 * 10/2006 Sakashita ....................... 345/204
2007/0063947 A1 * 3/2007 Kang .............................. 345/89
2007/0120807 A1 * 5/2007 Bai et al. ....................... 345/102
2007/0164946 A1 * 7/2007 Akutsu et al. .................. 345/87
2007/0171163 A1 * 7/2007 Miyata ............................ 345/87
2007/0195073 A1 * 8/2007 Izumi ............................ 345/204
2007/0285377 A1 * 12/2007 Yamazaki ...................... 345/101
2008/0074371 A1 * 3/2008 Tajiri .............................. 345/89
2008/0158443 A1 * 7/2008 Shiomi .......................... 348/790
2008/0246709 A1 * 10/2008 Mori ............................... 345/87
2008/0246710 A1 * 10/2008 Igarashi .......................... 345/87
2008/0252583 A1 * 10/2008 Sakashita et al. ............... 345/90
2009/0002350 A1 * 1/2009 Lo ................................ 345/204
2009/0009455 A1 * 1/2009 Kimura ........................... 345/89

(Continued)

*Primary Examiner* — Dwayne Bost
*Assistant Examiner* — Scott Trandai
(74) *Attorney, Agent, or Firm* — Brinks Hofer Gilson & Lione

(57) ABSTRACT

A liquid crystal display device and a video processing method of the same are disclosed. A video processing method of a liquid crystal display device includes a first step determining whether a current frame is a motion picture by comparing data of a current frame with data of a previous frame; a second step converting and outputting a number of bits of a white gradation data of the current frame and outputting data of the other gradations without the bit conversion, if it is determined in the first step that the current frame is the motion picture; a third step outputting the data of the current frame without the bit-conversion if it is determined in the first step that the current frame is a still image; and a fourth step comparing the data of the current frame outputted in the second or third step with data of a previous frame and outputting overdriving control (ODC) data converted based on the result of the comparison.

15 Claims, 5 Drawing Sheets

U.S. PATENT DOCUMENTS

2009/0085856 A1* 4/2009 Okada et al. .................... 345/94
2009/0262147 A1* 10/2009 Yoshida ........................ 345/690
2009/0315920 A1* 12/2009 Sakurai et al. ................ 345/690
2011/0134088 A1* 6/2011 Chen et al. .................... 345/204

* cited by examiner

LIQUID CRYSTAL DISPLAY DEVICE AND VIDEO PROCESSING METHOD THEREOF

This application claims the priority and the benefit under 35 U.S.C. §119(a) on Patent Application No. 10-2009-0128537 filed in Republic of Korea on Dec. 21, 2009 the entire contents of which is hereby incorporated by reference.

BACKGROUND

1. Field of the Invention

The present disclosure relates to a liquid crystal display device, more particularly, to a liquid crystal device that is able to improve a liquid crystal response time by applying overdriving especially to a high gradation region and an video processing method of the liquid crystal device.

2. Discussion of the Related Art

Liquid crystal display devices display images by using electrical or optical characteristics of liquid crystal. Specifically, such a liquid crystal display (LCD) device includes a liquid crystal panel for displaying images via a pixel matrix and a driving circuit for driving the liquid crystal panel. The LCD device includes a backlight unit, because the liquid crystal panel of the LCD device is a non-luminescent device. Liquid crystal alignment of each sub-pixel provided in the liquid crystal panel is variable according to a video signal to adjust transmissivity of lights emitted from the backlight unit such that the image may be displayed. Such the LCD devices have been used in compact display devices such as mobile communication terminals, portable computers and liquid crystal televisions and large-sized display devices more and more broadly.

The LCD device can be used to display motion pictures, because it is an active matrix type having a thin film transistor as switching device for each sub-pixel. However, the LCD device has a slow response time caused by unique characteristics such as viscosity and elasticity, and a hold type driving. Because of that, the LCD device would have a problem of motion blur generated by an afterimage of a previous frame. To solve this problem, an overdriving control (hereinafter, ODC) is used in that an overshoot voltage over a goal value is applied when there is change of data, after comparing data of neighboring frames to each other, to improve the liquid crystal response time in proportion to the applied voltage.

However, according to the ODC method of the related art, a range of gamma voltages for input data is identical to a range of gamma voltages for ODC data. As a result, it is impossible to apply ODC to high and low gradation regions. For example, it is impossible to increase voltages of white gradation data (255) out of the input data and to apply ODC to the white gradation data. Because of that, the liquid crystal response time in bright image of a motion picture and it is limited to improve motion blur.

BRIEF SUMMARY

A video processing method of a liquid crystal display device includes determining whether a current frame is a motion picture by comparing data of a current frame with data of a previous frame; converting and outputting a number of bits of a white gradation data of the current frame and outputting data of the other gradations without the bit-conversion, if it is determined in the first step that the current frame is the motion picture; outputting the data of the current frame without the bit-conversion if it is determined in the first step that the current frame is a still image; and comparing the data of the current frame outputted in the second or third step with data of a previous frame and outputting overdriving control (ODC) data converted based on the result of the comparison.

In another aspect, a liquid crystal display device includes a liquid crystal panel; a video processor that converts an outputting a number of bits of a white gradation data of a current frame determined as motion picture based on determination whether data of a current frame is a motion picture or still image by comparing data of a current frame with data of a previous frame, and outputs data of the other gradations and data of a still image without the bit-conversion, and the video processor converts and outputs input data of the current frame into ODC data based on the result of comparison between the data of the current frame having the converted bit converted or not and the data of the previous frame; a reference gamma voltage generator generates a plurality of reference gamma voltages by dividing an input voltage; a data driver generates a plurality of gamma voltages by specifying the plurality of the reference gamma voltages, the data driver supplies an analog signal converted from the data outputted from the video processor by using the plurality of the gamma voltages.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DETAILED DESCRIPTION OF THE DRAWINGS AND THE PRESENTLY PREFERRED EMBODIMENTS

Reference will now be made in detail to the specific exemplary embodiments of the present invention, examples of which are illustrated in the accompanying drawings. Wherever possible, the same reference numbers will be used throughout the drawings to refer to the same or like parts.

Figure 1:
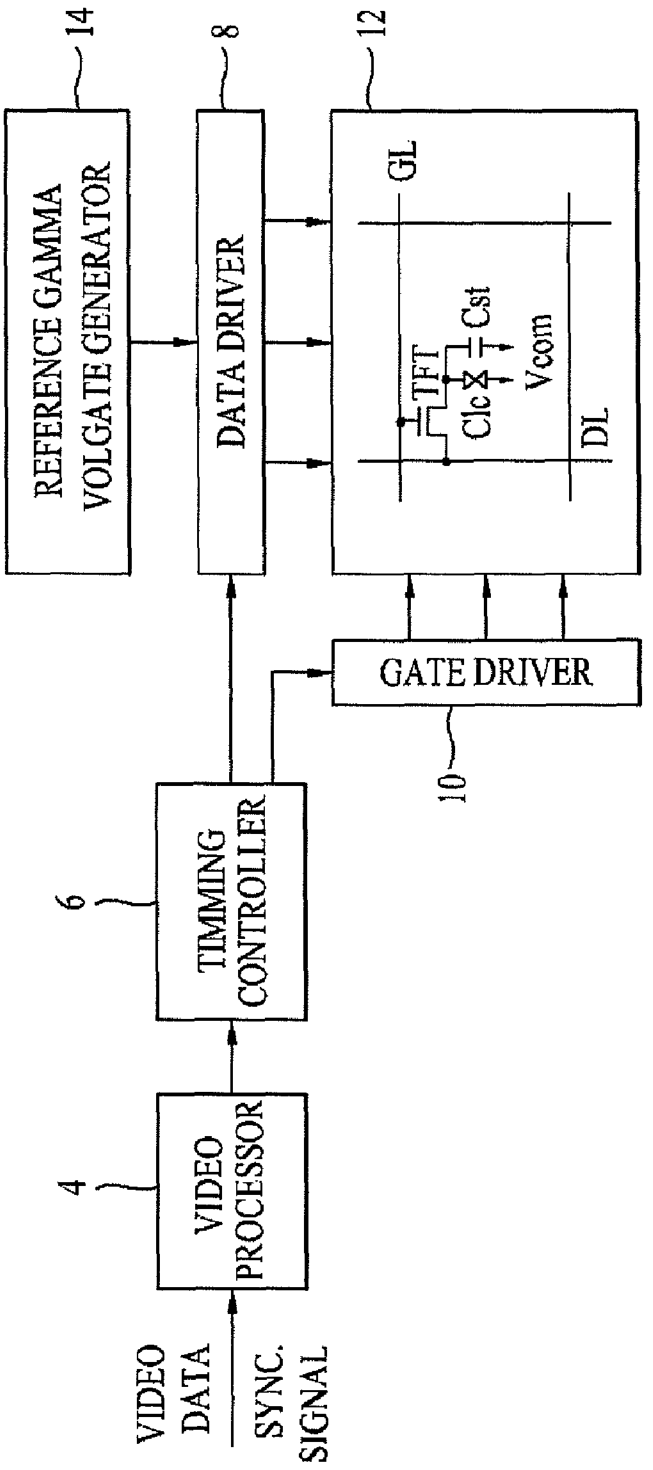
FIG. 1 is a block diagram schematically illustrating a liquid crystal display device according to an exemplary embodiment of the present invention.

FIG. 1 is a bock diagram schematically illustrating a liquid crystal display device according to an exemplary embodiment of the present invention.

The liquid crystal display (LCD) device shown in FIG. 1 includes a liquid crystal panel 12 for displaying images, a data driver 8 for driving data lines (DL) of the liquid crystal panel 12, a gate driver 10 for driving gate lines (GL) of the liquid crystal panel 12, a reference gamma generator 14 for supplying reference gamma voltages to the data driver 8, an video processor 4 for converting input data into ODC data to output it and a timing controller 6 for aligning output data from the video processor 4 to supply it to the data driver and for controlling the data driver 8 and the gate driver 10. Here, the video processor 4 may be embedded in the timing controller 6.

The video processor 4 compares data of a previous frame with data of a current frame and it modulates the data of the current frame into ODC data based on the result of the comparison to output the modulated data. Specifically, the video processor 4 modulates the data of the current frame into ODC data capable of increasing the data of the current frame if the data of the current frame is larger than the data of the previous frame and capable of decreasing the data of the current frame if the data of the current frame is smaller than the data of the previous frame. In addition, the video processor 4 outputs data identical to the data of the current frame if the data of the previous frame is identical to the data of the current frame. Before modulating the input data into the ODC data, in other words, before performing ODC, the video processor 4 determines whether the currently input data is a still image or motion picture. If it is determined that the currently input image is the motion picture, the video processor 4 decreases a number of bits of only white data (that is, 255 gradation) of the motion picture by 1 bit and it modulates the 1-bit decreased white data into ODC data to output. As a result, even the white data may be converted into the ODC data in the motion picture and the liquid crystal response time may be improved. If determining that the currently input data is the motion picture, the video processor 4 modulates input data of the other gradations except the white data into ODC data without bit converting and it outputs the modulated ODC data. If determining that the currently input data is the still picture, the video processor 4 outputs input data without bit converting and without converting it into ODC data. As a result, bits of the white data may not be decreased in normal images and white brightness of the still image may be prevented from decreasing. Such the video processor 4 may be embedded in the timing controller and detailed description of the video processor 4 will be made later.

The timing controller 6 aligns output data of the video processor 4 and it outputs the aligned data to the data driver 8. In addition, the timing controller 6 generates and outputs a data control signal for controlling a driving timing of the data driver 8 and a gate control signal for controlling a driving timing of the gate driver 10, by using synchronization signals, for example, a dot clock, data enable signal, horizontal synchronization signal and vertical synchronization signal. The plurality of the data control signals includes a source output enable signal for controlling a data output period of the data driver 8, a source start pulse for indicating start of data sampling, a source shift clock for controlling a sampling timing of data and a polarity control signal for controlling a voltage polarity of data. The plurality of the gate control signals include a gate start pulse for indicating a start of the gate driver 10, a gate shift clock for controlling a scan pulse output timing of the gate driver 10 and a gate output enable signal for controlling an output period of the scan pulse.

Figure 2:
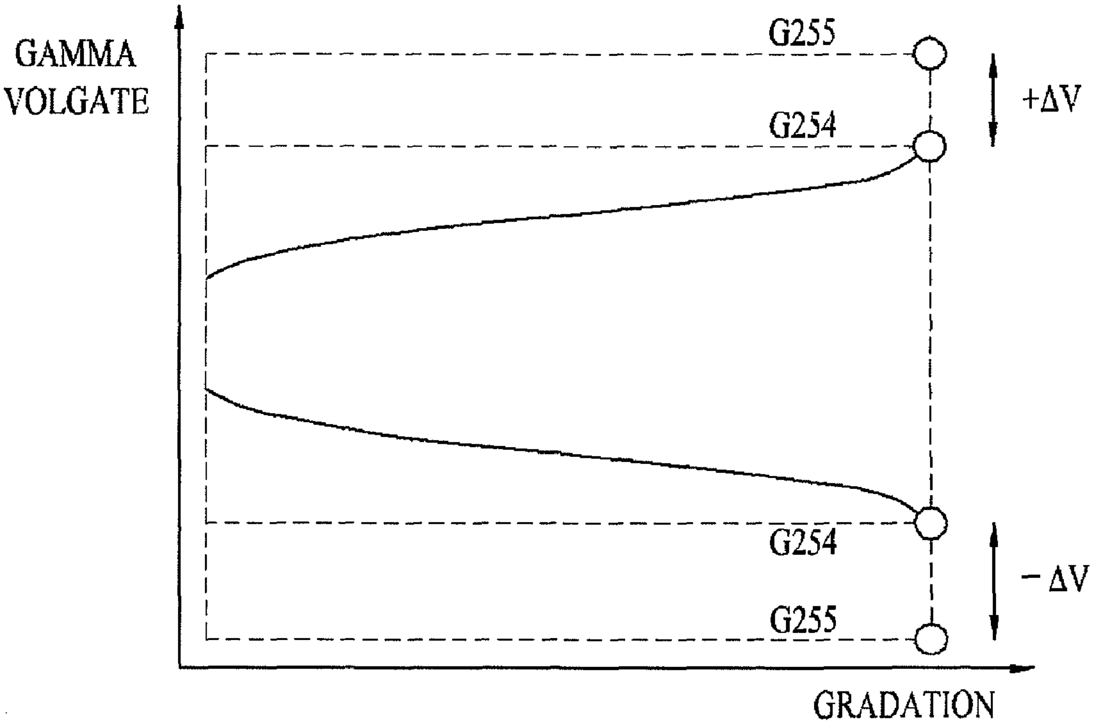
FIG. 2 is a graph illustrating changes of gamma voltages for gradation applied to a data driver shown in FIG. 1.

The reference gamma voltage generator 14 generates reference gamma voltages of positive polarity and reference gamma voltages of negative polarity and outputs the generated voltages to the data driver 8. Positive polarity and negative polarity is divided based on a common voltage (Vcom) supplied each of the sub-pixels of the liquid crystal panel 12 commonly. Especially, the reference gamma voltage generator 10 separately supplies a reference gamma voltage (G255) for a white gradation, that is, top level gradation 255 such as a gamma voltage curve shown in FIG. 2 from a reference gamma voltage (G254) for a second high level gradation, that is, 254 and it sets voltage difference between the top level reference gamma voltage G255 and the second top level reference gamma voltage G254 to be increased in comparison to the related art. For example, while the difference between the top level and second top reference gamma voltages (ΔV) according to the related art is 0.1V, the difference (ΔV) according to the present invention is increased to be in a rage of 0.2V~1V. To increase the voltage difference (ΔV), the positive reference gamma voltage G255 of the top level may be increased with decreasing the negative reference gamma voltage G255 or the positive reference gamma voltage G254 of the second top level may be decreased with increasing the negative reference gamma voltage G254. Here, the gamma voltage G255 of the top level is a gamma voltage for white data of the motion picture, which are modulated into the ODC data by the video processor 4, and a gamma voltage for white data of the still image.

The data driver 8 converts digital output data from the timing controller into analog data signals, that is, pixel voltage signals in response to the data control signal of the timing controller 6, by using the reference gamma voltages generated by the reference gamma voltage generator 14. The data driver 8 outputs the converted analog data signals to the data line (DL) of the liquid crystal panel 12. Specifically, the data driver 8 generates sequential sampling signals, shifting the source start pulse from the timing controller 6 according to the source start clock in the horizontal period (1H), and it sequentially latches the output data from the timing controller 6 in response to the generated sampling signals. The data driver 8 parallel-latches data of one horizontal line and then converts the latched data into the analog data signals and it outputs the analog data signals to the data lines (DL) of the liquid crystal panel. At this time, the data driver 8 specifies the positive and negative reference gamma voltages outputted from the reference gamma voltage generator 14 for each gradation, by using a serially-connected resistance string structure, and it converts the digital data into positive or negative analog data signals by using the positive and negative gamma voltages specified for each gradation.

The gate driver 10 sequentially drives the gate lines (GL) of the liquid crystal panel 12 in response to the gate control signal of the timing controller 6.

The liquid crystal panel 12 displays images via the pixel matrix having the aligned pixels. Each of the pixels presents a desired color by using combination of red, green and blue sub-pixels adjusting light transmissivity based on liquid crystal alignment changed according to data signals. Each of the sub-pixels includes a thin film transistor (TFT) connected with the gate line (GL) and the data line (DL), a liquid crystal capacitor (C1*c*) and a storage capacitor (Cst) parallel-connected with the thin film transistor (TFT). The liquid crystal capacitor (C1*c*) charges voltage difference between the data signal supplied to a pixel electrode via the thin film transistor (TFT) and the common voltage (Vcom) supplied to the common electrode and it adjusts light transmissivity by driving the liquid crystal based on the charged voltage. The storage capacitor (Cst) maintains the voltage charged to the liquid crystal capacitor (C1*c*). The liquid crystal panel 12 charges a voltage corresponding to the ODC data modulated by the video processor 4 when displaying an image having a big difference of data between adjacent frames to improve the response speed of the liquid crystal. When displaying a still image having a little difference of data between the adjacent frames, the liquid crystal panel 12 charges a voltage corresponding to the data not modulated into ODC data by the video processor 4 to prevent noise generated by ODC.

Figure 3:
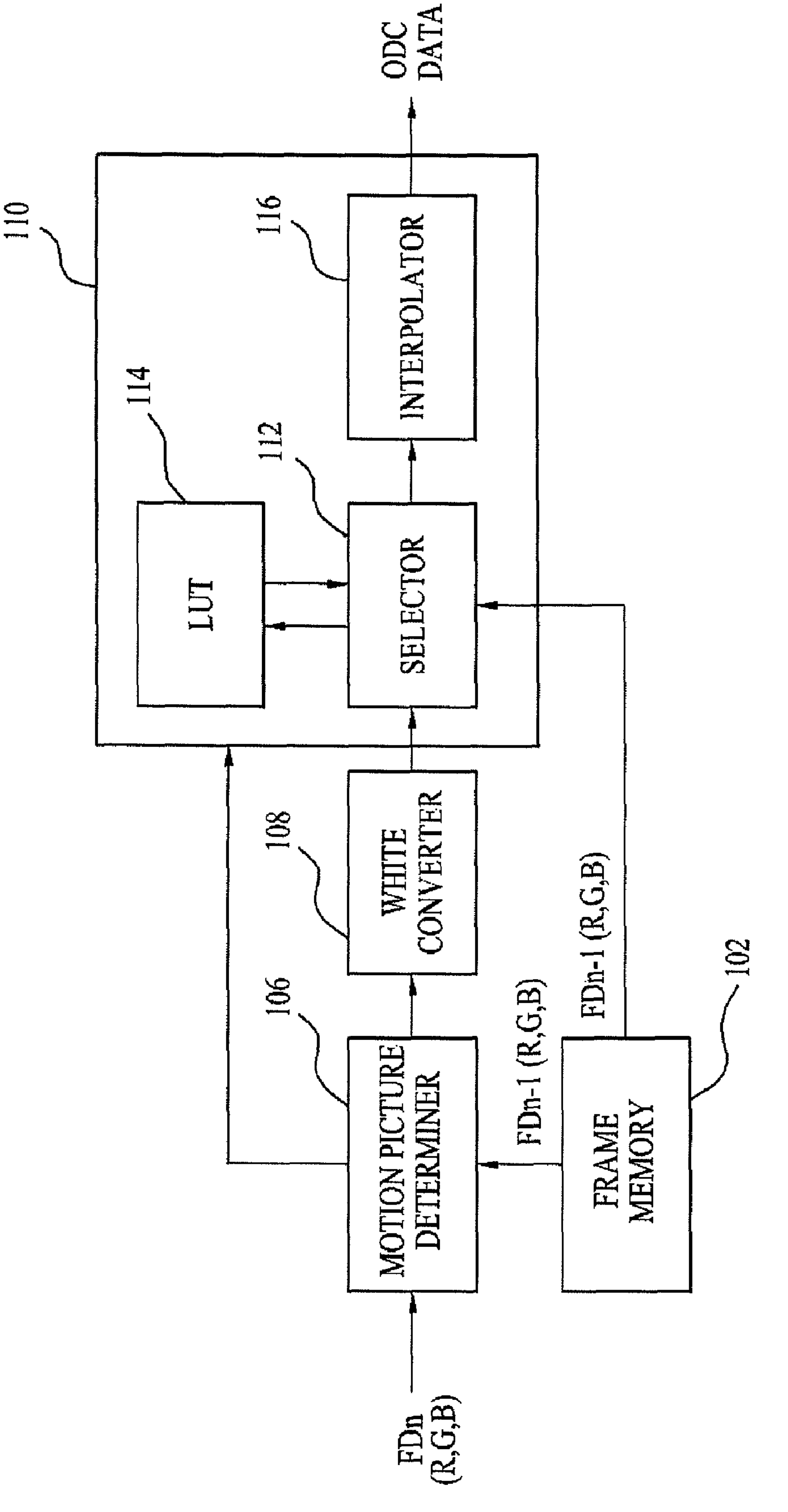
FIG. 3 is a block diagram illustrating an inner configuration of an video processor shown in FIG. 1.

FIG. 3 is a block diagram illustrating an inner configuration of the video processor 4 shown in FIG. 1.

The video processor 4 shown in FIG. 3 includes a frame memory 102, a motion picture determiner 106, a white converter 108 and an ODC circuit 110.

The frame memory 102 delays input data (FDn) of the current frame by a single frame to output a previous frame data (FDn−1).

The motion picture determiner 106 compares the previous frame data (FDn−1) outputted from the frame memory with the input data (FDn) of the current frame and it determines whether it is a still image or motion picture based on result of the comparison. If the input data (FDn) of the current frame is identical to the previous frame data (FDn−1), the motion picture determiner 106 generates a still image signal and it outputs the still image control signal to the white converter 108. If the input data (FDn) of the current frame is not identical to the previous frame data (FDn−1), the motion picture determiner 106 generates a motion picture signal and it outputs the motion picture control signal to the white converter 108. In addition, the motion picture determiner 106 outputs the data (FDn) of the current frame to the white converter 108.

The white converter 108 detects a white data signal from the current frame data (FDn) outputted from the motion picture determiner 106. If the motion picture control signal is inputted from the motion picture determiner 106, the white converter 108 decreases 1 bit of the detected white data (that is, 255) and the 1-bit-decreased white data (that is, 254) to the ODC circuit 110. The white converter 108 detects a white data signal from the current frame data (FDn) outputted from the motion picture determiner 106. If the still image control signal is inputted from the motion picture determiner 106, the white converter 108 outputs the detected white data (that is, 255) to the ODC circuit 110 without converting bits. If not detecting the white data from the current frame data (FDn), the white converter 108 outputs the current frame data (FDn) without converting bits, regardless of the image control signal outputted from the motion picture determiner 106. In other words, the white converter 108 decreases 1 bit only from the white data detected from the motion picture and it outputs the white data having decreased 1 bit. The white converter 108 outputs the white data of the still image and data of the other gradations except the white data to the ODC circuit 110 as they are, without converting bits.

The ODC circuit 110 compares the previous frame data (FDn−1) outputted from the frame memory 102 with the current frame data (FDn) outputted from the white converter 108. The ODC circuit 110 modulates the current frame data (FDn) into ODC data based on the result of the comparison and it outputs the modulated ODC data. If the current frame data (FDn) is larger than the previous frame data (FDn−1), the ODC circuit 110 modulates the current frame data (FDn) into ODC data increasing the current frame data (FDn). If the current frame data (FDn) is smaller than the previous frame data (FDn−1), the ODC circuit 110 modulates the current frame data (FDn) into ODC data decreasing the current frame data (FDn). In addition, the ODC circuit 110 outputs data identical to the current frame data (FDn) if the previous frame data (FDn−1) is identical to the current frame data (FDn). Especially, in case of the motion picture, 1 bit of the white data of the current frame is decreased by the white converter 108 and the ODC circuit 110 modulates the white data having the decreased 1 bit into ODC data having an increased 1 bit and it outputs the modulated ODC data. In case of the still image, the ODC circuit 110 outputs the white data of the current frame as it is without modulating it into ODC data. That is, the ODC circuit 110 may output the current frame data (FDn), not modulating it into ODC data, if the still image control signal of the still image determined by the motion picture determiner 6 is inputted.

Specifically, the ODC circuit 110 shown in FIG. 3 stores only ODC data corresponding to high bits of the previous frame and current frame in a lookup table 114. The ODC circuit 110 derives ODC data of the other data not stored in the lookup table 114 by interpolating four ODC data, selected from the lookup table 114 based on the high bits of the current and previous frames, in horizontal and vertical directions based on low level bits of the current and previous frames. For that, the ODC circuit 110 includes a selector 112, a lookup table (LUT, 114) and an interpolator 116.

The lookup table 114 has preset ODC data stored therein, which is mapped in response to high level bits of the current frame data (FDn) and high level bits of the previous frame data (FDn−1), for example, high level 4 bits in case the input data is 8 bit. ODC data larger than the high level bit of the current frame data (FDn) is stored in a predetermined region of the lookup table 114 where the high level bit of the current frame data (FDn) is larger than the high level bit of the previous frame data (FDn−1). ODC data decreased to be smaller than the high level bit of the current frame data (FDn) is stored in a predetermined region where the high level bit of the current frame data (FDn) is smaller than the high level bit of the previous frame data (FDn−1). Auxiliary ODC data is not stored or data identical to the high level bits of the current frame data (FDn) and the previous frame data (FDn−1) is stored in a predetermined area where the high level bit of the current frame data (FDn) is identical to the high level bit of the previous frame data (FDn−1).

The selector 112 selects and outputs ODC data corresponding to the previous frame data (FDn−1) and the current frame data (FDn) from the lookup table 114. when data of the previous frame and current frame not stored in the lookup table 114, the selector 112 selects two ODC data horizontally adjacent to the high level bit of the current frame data (FDn) from the lookup table 114 and it selects two ODC data vertically adjacent to the high level bit of the previous frame data (FDn−1) from the lookup table 114, in order to output the selected four ODC data to the interpolator 116.

When single ODC data corresponding to both of the previous frame data (FDn−1) and the current frame data (FDn) is inputted from the selector 112, the interpolator 116 outputs the corresponding ODC data as it is. When the four ODC data adjacent to both of the previous frame data (FDn−1) and the current frame data (FDn) are inputted from the selector 112, the interpolator 116 performs horizontal interpolation by using the four ODC data and a low level bit of the current frame data (FDn) and vertical interpolation by using the four ODC data and the low level bit of the previous frame data (FDn−1), such that ODC data located in the four ODC data range may be generated. In other words, data in a gradation range not stored in the lookup table 114 is modulated into ODC data by the interpolator 116.

Figure 4A:
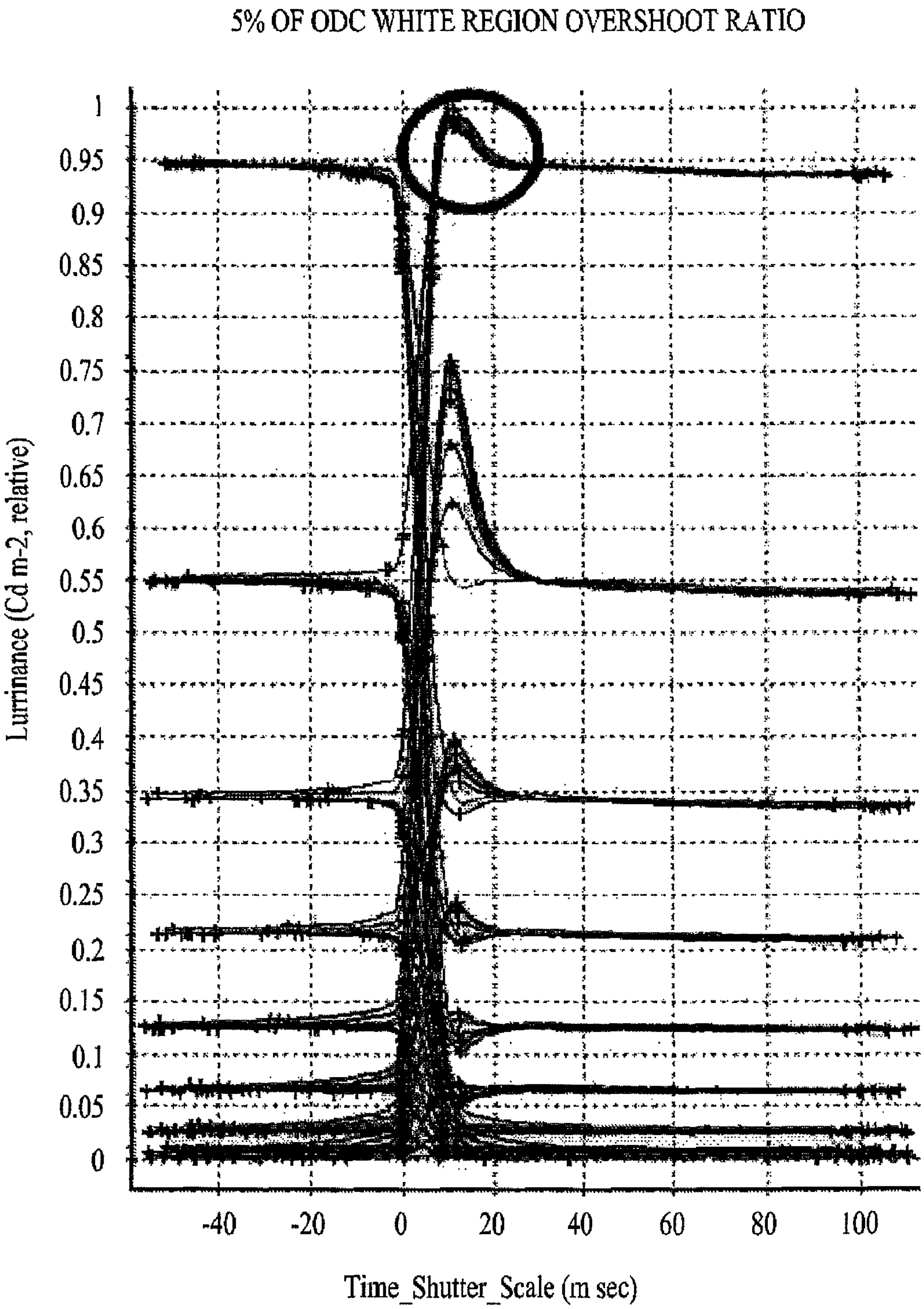
FIGS. 4A and 4B are graphs illustrating a motion picture response time according to an overshoot ratio when a predetermined gradation is changed into a white gradation according to the present invention.
Figure 4B:
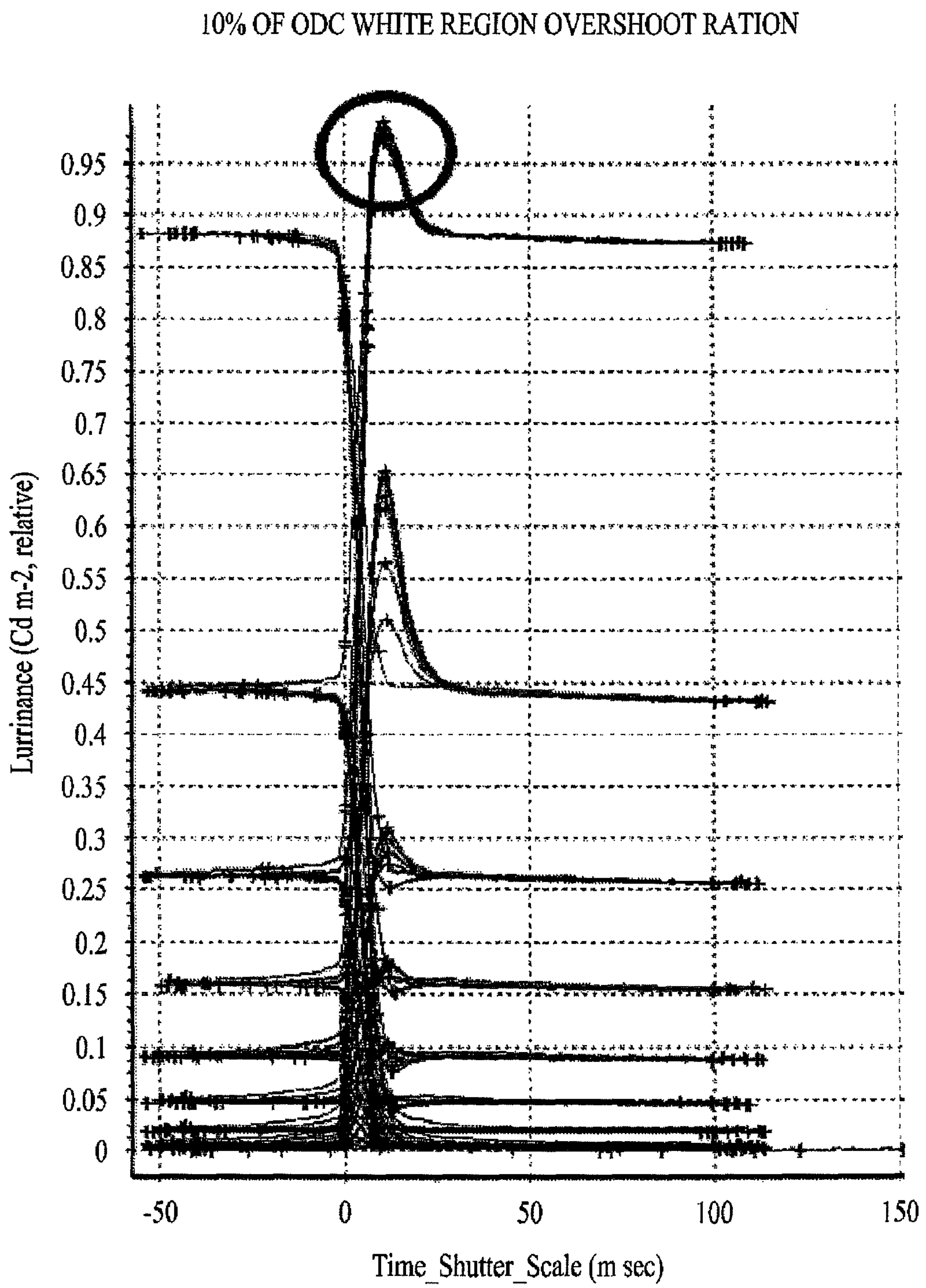

FIG. 4A illustrates a motion picture response curve (MPRC) in case that only 5% of the overshoot voltage is applied to the white data of the motion picture having random gradation modulated into the white gradation and FIG. 4B illustrates a motion picture response curve (MPRC) in case that 10% of the overshoot voltage is applied to the white data of the motion picture having random data modulated into the white gradation. In reference to FIGS. 4A and 4B, the overshoot voltage with respect to the white data is applied in the motion picture having random gradation changed into white gradation and it is shown that the motion picture response time of the liquid crystal is decreased.

Accordingly, the liquid crystal display device according to the present invention determines the motion picture or still image and it decreases 1 bit of the white data of the motion picture to modulate the decreased data into ODC data. As a result, in case random data is changed into white data as shown in FIG. 4, only an overshoot voltage for the white data is applied to improve the response speed of liquid crystal. Moreover, the liquid crystal display device according to the present invention may output the white data of the still image as it is without modulating any bits and the white data of the still image may use a top level gamma voltage identical to the voltage used by the white data of the motion picture modulated into the ODC. As a result, brightness may be prevented from decreasing in the white gradation of the still image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A video processing method of a liquid crystal display device comprising:

a) determining whether a current frame is a motion picture by comparing data of a current frame with data of a previous frame;

b) converting and outputting a number of bits of a white gradation data of the current frame and outputting data of the other gradations without the bit-conversion, when it is determined in the first step that the current frame is the motion picture;

c) outputting the data of the current frame without the bit-conversion when it is determined in the first step that the current frame is a still image; and d) comparing the output data from the second or third step with data of a previous frame and performing a conversion process to generate overdriving control (ODC) data when the compared data are not identical.

2. The video processing method of claim 1, wherein the a) determines that the current frame is the still image when the data of the current frame is identical to data of the previous frame and the first step determines that it is the motion picture when the data of the current frame is not identical to the data of the previous frame.

3. The video processing method of claim 1, wherein d) outputs the input data of the current frame not converted into the ODC data when it is determined in a) step that the current frame is the still image.

4. The video processing method of claim 1, further comprising:

e) step generating a plurality of reference gamma voltages by dividing an input voltage;

f) generating a plurality of gamma voltage by specifying the plurality of the reference gamma voltages; and i) supplying an analog signal to data lines of a liquid crystal panel, the analog signal converted from the data outputted in d) by using the plurality of the gamma voltages.

5. The video processing method of claim 4, wherein the e) generates and outputs a reference gamma voltage of a top level gradation and a reference gamma voltage of a second top level gradation independently, and the top level reference gamma voltage and the second top level reference gamma voltage have a voltage difference in a range of at least 0.2~1 V, respectively.

6. The video processing method of claim 5, wherein b) decreases 1 bit of the white data detected from the motion picture and b) outputs the white data having the decreased 1 bit; and when random gradation data of the previous frame is converted into the white data having the decreased 1 bit, the white data having the decreased 1 bit is converted into ODC white data.

7. The video processing method of claim 6, wherein i), selects and outputs the top level gamma voltage for the ODC white data of the motion picture; and selects and outputs the top level gamma voltage for white data of the still image.

8. The video processing method of claim 1, wherein d), converts input data of the current frame into the ODC data decreased to be smaller than the data of the current frame, when the data of the current frame is smaller than the data of the previous frame;

converts input data of the current frame into the ODC data increased to be larger than the data of the current frame, when the data of the current frame is larger than the data of the previous frame; and output the data of the current frame, when the data of the current frame is identical to the data of the previous frame.

9. A liquid crystal display device comprising:

a liquid crystal panel;

an video processor that converts and outputs a number of bits of a white gradation data of a current frame determined as motion picture based on determination whether data of a current frame is a motion picture or still image by comparing data of a current frame with data of a previous frame, and outputs data of the other gradations and data of a still image without the bit-conversion, and the video processor converts and outputs input data of the current frame into ODC data based on the result of comparison between the data of the current frame having the converted bit or not and the data of the previous frame;

a reference gamma voltage generator that generates a plurality of reference gamma voltages by dividing an input voltage; and a data driver that generates a plurality of gamma voltages by specifying the plurality of the reference gamma voltages, the data driver supplies an analog signal converted from the data outputted from the video processor by using the plurality of the gamma voltages.

10. The liquid crystal display device of claim 9, wherein the video processor comprises, a frame memory that delays data of the current frame and supplies the delayed data to the data of the previous frame;

a motion picture determiner that determines that the current frame is the still image when the data of the previous frame is identical to the data of the current frame and determines that it is the motion picture when not identical based on the result of comparison, after comparing the data of the previous frame with the data of the current frame;

a white converter that converts and outputs the number of bits of the white data of the current frame and outputs data of the other gradations without the bit-conversion, when it is determined by the motion picture determiner that the current frame is the motion picture, and the white converter outputs the data of the current frame without the bit-conversion, when it is determined by the motion picture determiner that it is the still image; and an ODC circuit that compares the data of the current frame from the white converter and the data of the previous frame from the frame memory and outputs the ODC data converted based on the result of the comparison.

11. The liquid crystal display device of claim 10, wherein the ODC circuit outputs input data of the current frame without converting the input data into the ODC data, when it is determined by the motion picture determiner that the input data of the current frame is the still image.

12. The video processing method liquid crystal display device of claim 9, wherein the reference gamma voltage generator generates and outputs a reference voltage of a top level gradation and a reference gamma voltage of a second top gradation independently; and the top level reference gamma voltage and the second top level reference gamma voltage have a voltage difference in a range of at least 0.2~1 V, respectively.

13. The liquid crystal display device of claim 10, wherein the white converter decreases 1 bit of the white data detected from the motion picture and the white converter outputs the white data having the decreased 1 bit; and the ODC circuit converts the white data having the decreased 1 bit into ODC white data, when data of a random gradation composing the previous frame is converted into the white data having the decreased 1 bit of the current frame.

14. The liquid crystal display device of claim 13, wherein the data driver selects and outputs the top level gamma voltage when the ODC white data is supplied from the video processor; and the data driver selects and outputs the top level gamma voltage when the white data of the still image is supplied from the video processor.

15. The liquid crystal display device of claim 13, wherein the ODC circuit converts the data of the current frame into the ODC data decreased to be smaller than the data of the current frame, when the data of the current frame is smaller than the data of the previous frame;

the ODC circuit converts the data of the current frame into the ODC data increased to be larger than the data of the current frame, when the data of the current frame is larger than the data of the previous data; and the ODC circuit outputs the data of the current frame, when the data of the current frame is identical to the data of the previous frame.

* * * * *